United States Patent [19]

Schenk

[11] Patent Number: 5,091,703
[45] Date of Patent: Feb. 25, 1992

[54] ANALOG LINE CONNECTION

[75] Inventor: Heinrich Schenk, Munich, Fed. Rep. of Germany

[73] Assignee: Siemens Aktiengesellschaft, Munich, Fed. Rep. of Germany

[21] Appl. No.: 615,162

[22] Filed: Nov. 19, 1990

[30] Foreign Application Priority Data

Feb. 22, 1990 [DE] Fed. Rep. of Germany ....... 4005644

[51] Int. Cl.$^5$ .................... H03H 5/00; H03F 1/100
[52] U.S. Cl. .................... 333/24 R; 333/100; 330/195; 455/5
[58] Field of Search .......... 333/24 R, 100, 124, 333/130; 330/195, 196, 55, 53, 286; 455/3, 5; 375/59; 379/392, 395

[56] References Cited

PUBLICATIONS

Hübner et al., "Digitale Duplex-Zweidrahtübertragung nach dem Prinzip der Adaptiven Echokompensation", Nachrichtentech., Electron, vol. 34, No. 8, pp. 303–306.
Fisk et al., "Balanced Electronic Hybrid Circuits", IBM Technical Disclosure Bulletin, vol. 16, No. 2, 1973, pp. 495–496.
Trick, U., "Ein Vergleich von Integrierten Schaltunger für die U-Schnittstelle in Digitalisierten Ortsnetz", NTZ Archiv. Bd., vol. 11, No. 5, 1989, pp. 211–219.

Primary Examiner—Eugene R. LaRoche
Assistant Examiner—Ali Neyzari

[57] ABSTRACT

An analog line connection circuit provides that the transmission voltage is not superimposed on the received voltage given a data transmission in duplex operation via a two-wire line. The line connection circuit is provided with an amplifier that comprises two symmetrical outputs, the first of these outputs being connected via a first ohmic connecting resistor to a first terminal of a first winding of a transformer and the second output being connected via a second ohmic connecting resistor to a second terminal of the first winding of the transformer. The transformer comprises a second winding connected to a transmission line. A series circuit of a first auxiliary resistor, a complex impedance and a second auxiliary resistor is connected between the outputs of the amplifier. The two ohmic voltage dividers are respectively arranged cross-connected between a terminal point of the first winding of the transformer and a junction of an auxiliary resistor with the complex impedance, the received voltage being output at the outputs of these ohmic divider resistors for a receiver uninfluenced by the transmission voltage.

8 Claims, 1 Drawing Sheet

ANALOG LINE CONNECTION

BACKGROUND OF THE INVENTION

1. Field of the Invention

The present invention relates to an analog line connection of the type having an amplifier that comprises two symmetrical outputs, the first of the outputs being connected via a first ohmic connecting resistor to a first terminal of the first winding of a transformer and the second output thereof being connected via a second ohmic connecting resistor to a second terminal of the first winding of the transformer, the transformer having a secondary winding connected to a transmission line, and having two voltage dividers each respectively composed of two dividing resistors, the first voltage divider connected from the second terminal of the transformer to the first output of the amplifier and the second voltage divider connected from the first terminal of the transformer to the second output of the amplifier, and in which the junctions of the dividing resistors of the voltage dividers form reception connecting points for connection of receiving equipment.

2. Description of the Prior Art

In modern communication networks, voice, texts, data or pictures are transmitted converted into digital signals. For transmission, the digital signals are coded into pulses suitable for the transmission medium, here, for example, an electrical line. Binary, ternary and quaternary coding are cited here as examples of such coding whereby 2-4 amplitude levels are employed. The decoding of an electrical signal is all the more difficult at the receiving side the more amplitude levels there are to an electrical signal. This problem becomes particularly serious when messages are simultaneously transmitted in both directions via a two-wire line. So that its own transmission voltage does not act on the receiving equipment, specific line connections are employed that are fashioned as symmetrical termination sets for reasons of tolerances. Line connections for digital signals that have been heretofore disclosed are realized with resistors, as a result whereof, however, a compensation of the transmission voltage is only conditionally possible.

SUMMARY OF THE INVENTION

An object of the present invention is to provide a line connection which can be balanced simply and with little circuit expense.

The above object is achieved, according to the present invention, in an analog line connection having an amplifier that comprises two symmetrical outputs, a first of these outputs being connected via a first ohmic connecting resistor to a first terminal of a first winding of a transformer and a second output thereof being connected via a second ohmic connecting resistor to a second terminal of the first winding of the transformer, the transformer having a secondary winding connected to a transmission line, and having two voltage dividers each respectively composed of two dividing resistors, a first of the voltage dividers connected from the second terminal of the transformer to the first output of the amplifier and the second voltage divider connected from the first terminal of the transformer to the second output of the amplifier, and wherein the junctions of the dividing resistors form receiving connection points to which a receiver can be connected, and is particularly characterized in that the first voltage divider is connected via a first ohmic additional resistor to the first output of the amplifier and the second voltage divider is connected via a second ohmic additional resistor to the second output of the amplifier, in that a complex resistor is connected between the junctions of the additional resistors with the voltage dividers, in that the first dividing resistor in a voltage divider is connected to an additional resistor and a second dividing resistor of the other voltage divider connected to a receiver connecting point are respectively identical, and in that the ratio of the complex resistor to the additional resistors optimally corresponds to the ratio of the input resistance of the transmission line transformed onto the first winding of the transformer to the corresponding connecting resistors.

According to a particular feature of the invention, the line connection is characterized in that the additional resistors and the complex resistor have at least ten times the value of resistance of the connecting resistors or, respectively, of the transformed input resistance.

According to another feature of the invention, the line connection is characterized in that all dividing resistors have the same value of resistance.

According to another feature of the invention, the line connection is characterized in that the values of resistance of the dividing resistors have at least ten times the value of the connecting resistors.

According to another feature of the invention, the line connection is characterized in that the series circuit of a series resistor with the parallel circuit of a parallel resistor and a parallel capacitor is provided as the complex resistor.

According to another feature of the invention, the line connection is characterized in that the complex resistor can be balanced.

According to another feature of the invention, the line connection is characterized in that one of the dividing resistors can be balanced.

It is particularly advantageous that only one complex resistor is required and need be balanced.

It is advantageous when the additional resistors are selected significantly higher in impedance than the transformed line input impedance and the corresponding connecting impedance. As a result, the power consumption remains low.

For tolerance reasons of the components, the line connections should be symmetrically constructed. The requirements made of the D.C. voltage suppression of a receiver are then also low.

BRIEF DESCRIPTION OF THE DRAWING

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
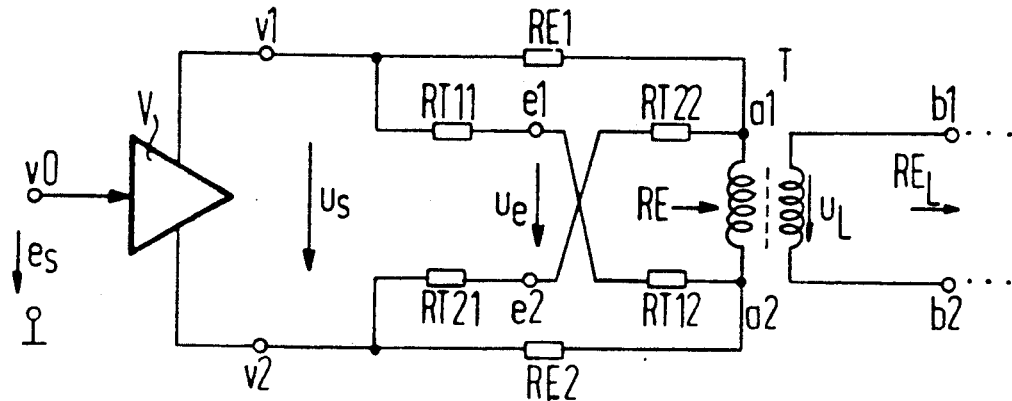
FIG. 1 is a schematic representation of a known line connection.

Referring to FIG. 1, a known line connection is illustrated as comprising an amplifier V having a symmetrical output v1 and v2. The output resistances are negligibly low. The first output amplifier v1 is connected via a first connecting resistor RE1 to a first terminal a1 of the first winding of the transformer T. In the same fashion, the second amplifier output v2 is connected via a second connecting resistor RE2 to a second terminal a2 of the first winding of the transformer T. A first voltage divider including a pair of dividing resistors RT11 and RT12 is inserted between the first amplifier output v1 and the second terminal a2, whereas a second voltage divider including a pair of dividing resistors RT21 and RT22 is connected between the second amplifier output v2 and the first terminal a1. The junctions of the dividing resistors form the receiving terminal points e1 and e2 for the connection of a receiver (not shown). The transmission line is connected to the terminal points b1 and b2 of a second winding of the transformer T. For example, a module PEB 20902 of Siemens AG may be employed as the amplifier.

A voltage $u_L$ received at the input of the line is transformed onto the first winding of the transformer T and, attenuated by the dividing resistors, is supplied to the receiver at the terminal points e1 and e2 as a reception voltage ue, the receiver comprising two differential inputs. The output resistors of the amplifier V are lowimpedance resistors, so that a matching of the input resistor of the transmission line is achieved by the connecting resistors. The input signal ES applied at the input v0 of the amplifier v is output at the symmetrical amplifier outputs, as in the case of a differential amplifier, equiphase, on the one hand, and inverted, on the other hand.

The transmission voltage $u_s$ applied between the amplifier outputs v1 and v2 dare not be superimposed by the reception voltage $u_e$. When it is assumed that the input resistor RE of the transformer, this being composed of the input resistance $RE_L$ of the transmission line transformed onto the first winding and of the resistances of the transformer itself, has twice the value in terms of amount as each connecting resistor RE1, RE2, then an optimum attenuation of the transmission voltage is obtained given a ratio of resistances of the dividing resistors RT11 to RT12 or, respectively, RT21 to RT22 of 2:1. Because of the complex input resistance, however, a complete compensation of the transmission voltage cannot be achieved. An improvement could be achieved by employing complex resistors instead of the dividing resistors or instead of the connecting resistors. As a result thereof, however, not only does the number of components rise considerably, more narrowly-tolerance capacitors (and, potentially, inductances) are also required since the complex resistors must be balanced in pairs. In addition, an additional balancing of the dividing resistors is also possible.

Figure 2:
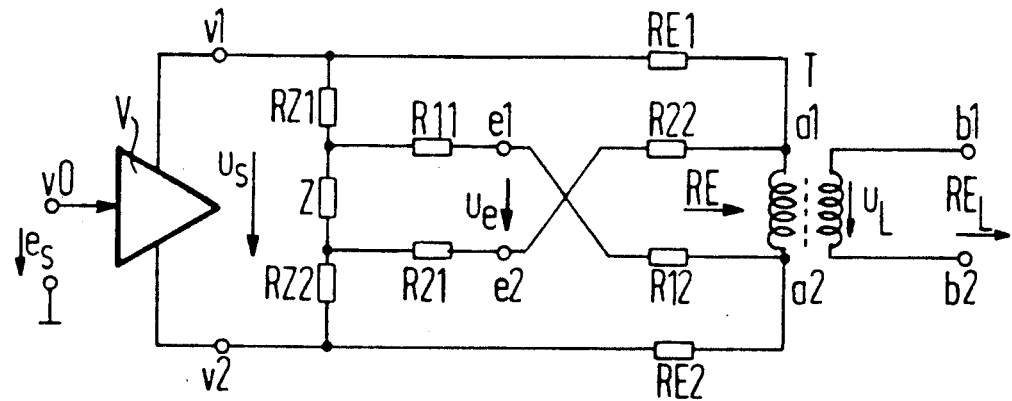
FIG. 2 is a schematic illustration of a line connection constructed in accordance with the present invention.

The line matching circuit of the present invention illustrated in FIG. 2 likewise contains an amplifier V whose symmetrical outputs v1 and v2 are again connected to the transformer T via the connecting resistors RE1 and RE2. However, it contains an additional series circuit composed of a first ohmic, auxiliary resistor RZ1, of a complex resistor Z and of a second, ohmic auxiliary resistor RZ2 that is arranged between the amplifier outputs. It again also contains two voltage dividers, whose dividing resistors R11, R12 and R21, R22, however, are differently dimensioned. Instead of being connected to the first amplifier output v1, the first dividing resistor R11 is connected to the junction of the first auxiliary resistor RZ1 and the complex impedance Z. In the same fashion, the first dividing resistor R21 of the second voltage divider is connected to the junction of the second auxiliary resistor RZ2 and the complex impedance Z. The connecting resistor RE1, the input resistor RE and the second connecting resistor RE2 now form a branch of a bridge circuit whose second branch is formed of the series circuit of the first auxiliary resistor RZ, the complex impedance Z and the second auxiliary resistor RZ2. With reference to the receiving terminal points e1, e2, a complete compensation of the transmission voltage $u_s$ is obtained when the resistors of the series circuit RZ1, Z, RZ2 are proportional to the values of resistance of the resistors RE1, RE and RE2 and when the dividing resistors are R11=R22 and R21=R12.

As already mentioned above, the connecting circuit can be most precisely symmetrically constructed. In this case, both auxiliary resistors have the same value of resistance, just as both connecting resistors have the same value of resistance. All of the dividing resistors R11-R22 are also of the same size. This also has the advantage that only low demands are made of the common mode rejection of the receiver.

In order to keep the power consumption low, it is not only the dividing resistors that are selected to be high-impedance components; the auxiliary resistors RZ1, RZ2 and, therefore, the complex impedance Z are also selected to be high-impedance components (R11, ... $\geq 10 \times$ RE1, ...; RZ1, ... $\geq 10 \times$ RE1, ...).

An arbitrary network can be utilized for the complex impedance Z that optimally well simulates the complex input resistance RE that is essentially defined by the transmission line. Given narrowly-tolerance ohmic resistors, it is usually adequate to balance only the complex impedance Z. Of course, resistor tolerances can also be compensated by varying one of the bridge resistors or an auxiliary resistor.

The value of resistance of the auxiliary resistors and of the dividing resistors should have at least ten times the value of the connecting resistors.

Figure 3:
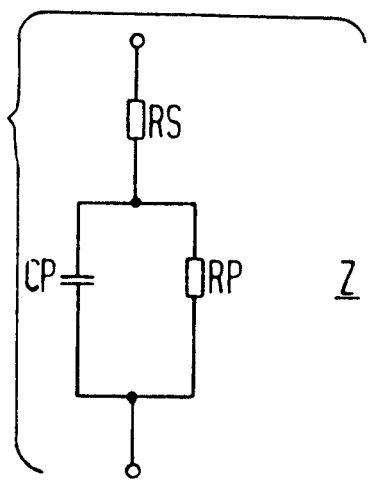
FIG. 3 is a schematic illustration of a complex resistor which may be employed in practicing the present invention.

An arbitrary network can be utilized for the complex impedance that simulates the complex input resistance RE that is essentially defined by the connected transmission line. A simple network for the complex impedance Z is illustrated in FIG. 3. It is composed of an ohmic series resistor RS that is connected in series with the parallel circuit of a parallel resistor RP and of a parallel capacitor CP.

Generally valid for this circuit is:

$$Z \approx [(RZ1+RZ2)/(RE1+RE2)] \times RE.$$

When the output resistance between the amplifier outputs is a lowimpedance output, it is selected as RE1+RE2=RE. When, by contrast, the amplifier resistance can no longer be omitted from consideration, then the connecting resistors are correspondingly reduced.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a line connection circuit of the type in which an amplifier has first and second symmetrical outputs respectively connected via first and second connecting resistors to first and second terminals of a first winding of a transformer which has a second winding connected to a transmission line, in which a first voltage divider comprises first and second divider resistors connected in series at a first connecting point for a receiver and is connected between said first output of said amplifier and said second terminal of said transformer, and in which a second voltage divider comprises third and fourth divider resistors connected in series at a second connecting point for the receiver and is connected between said second output of said amplifier and said first terminal of said transformer, the improvement therein comprising:

a first auxiliary resistor connected between said first divider resistor and said first output of said amplifier;

a second auxiliary resistor connected between said third divider resistor and said second output of said amplifier;

said first divider resistor and said fourth divider resistor being of identical values; said third divider resistor and said second divider resistor being of identical values; and a complex impedance connected between said first and second auxiliary resistors, the impedance ratio of said complex impedance to said auxiliary resistors optimally corresponding to the ratio of the input impedance of the transmission line transformed onto the first winding of the transformer to that of the first and second connecting resistors.

2. The improved line connection circuit of claim 1, wherein:
said first and second auxiliary resistors and said complex impedance have at least ten times the value of resistor of said first and second connecting resistors.

3. The improved line connection circuit of claim 1, wherein:
said first and second auxiliary resistors and said complex impedance have at least ten times the value of resistor of the transformed input impedance.

4. The improved line connection circuit of claim 1, wherein:
said first, second, third and fourth divider resistors have the same values of resistor.

5. The improved line connection circuit of claim 1, wherein:
said first, second, third and fourth divider resistor have at least ten times the resistor value of said first and second connecting resistors.

6. The improved line connection circuit of claim 1, wherein:
said complex impedance comprises a parallel circuit including a parallel resistor and a parallel capacitor, and a series resistor connected in series with said parallel circuit.

7. The improved line connection circuit of claim 1, wherein:
said complex impedance comprises a balanced complex impedance.

8. The improved line connection circuit of claim 1, wherein:
one of said first, second, third and fourth divider resistors is balanced.

* * * * *